United States Patent
Friedrich

(10) Patent No.: US 12,318,730 B2
(45) Date of Patent: Jun. 3, 2025

(54) OXIDATION CATALYST WITH PHOSPHORUS TRAP

(71) Applicant: UMICORE AG & CO. KG, Hanau-Wolfgang (DE)

(72) Inventor: Birgit Friedrich, Otzberg (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 336 days.

(21) Appl. No.: 17/906,395

(22) PCT Filed: May 6, 2021

(86) PCT No.: PCT/EP2021/061931
§ 371 (c)(1),
(2) Date: Sep. 15, 2022

(87) PCT Pub. No.: WO2021/224362
PCT Pub. Date: Nov. 11, 2021

(65) Prior Publication Data
US 2023/0158454 A1    May 25, 2023

(30) Foreign Application Priority Data
May 6, 2020   (EP) .................................... 20173091

(51) Int. Cl.
*B01D 53/94*   (2006.01)
*B01J 23/44*   (2006.01)
*B01J 35/66*   (2024.01)

(52) U.S. Cl.
CPC ............ *B01D 53/944* (2013.01); *B01J 23/44* (2013.01); *B01J 35/66* (2024.01);
(Continued)

(58) Field of Classification Search
CPC .......... B01D 53/944; B01D 2255/1021; B01D 2255/1023; B01D 2255/9032;
(Continued)

(56) References Cited

U.S. PATENT DOCUMENTS 6,890,616 B2 * 5/2005 Suwabe ........... B01D 46/24491
422/177
8,444,739 B2 * 5/2013 Mizuno .............. B01D 46/2482
422/177
(Continued)

FOREIGN PATENT DOCUMENTS

| | | |
|---|---|---|
| CN | 102435628 A | 5/2012 |
| CN | 103269773 A | 8/2013 |

(Continued)

OTHER PUBLICATIONS

Communication to applicant regarding observations by third parties received Dec. 21, 2021 in European Application No. 20173091.8 (3 pages).
(Continued)

*Primary Examiner* — Dapinder Singh
(74) *Attorney, Agent, or Firm* — Smith, Gambrell & Russell, LLP

(57) ABSTRACT

The present invention relates to a catalyst, which comprises * a carrier substrate with a first end a and a second end b, and length L, * a material zone A containing a platinum group metal on a support material with a load of 40 to 150 g/l, relative to the volume of the carrier substrate and * material zone B containing a platinum group metal on a support material with a load of 75 to 200 g/l, relative to the volume of the carrier substrate, wherein material zone B has a greater content of platinum group metal, relative to the volume of the carrier substrate and calculated in g/l, than material zone A, and wherein material zone B has a pro-
(Continued)

Figure 1:
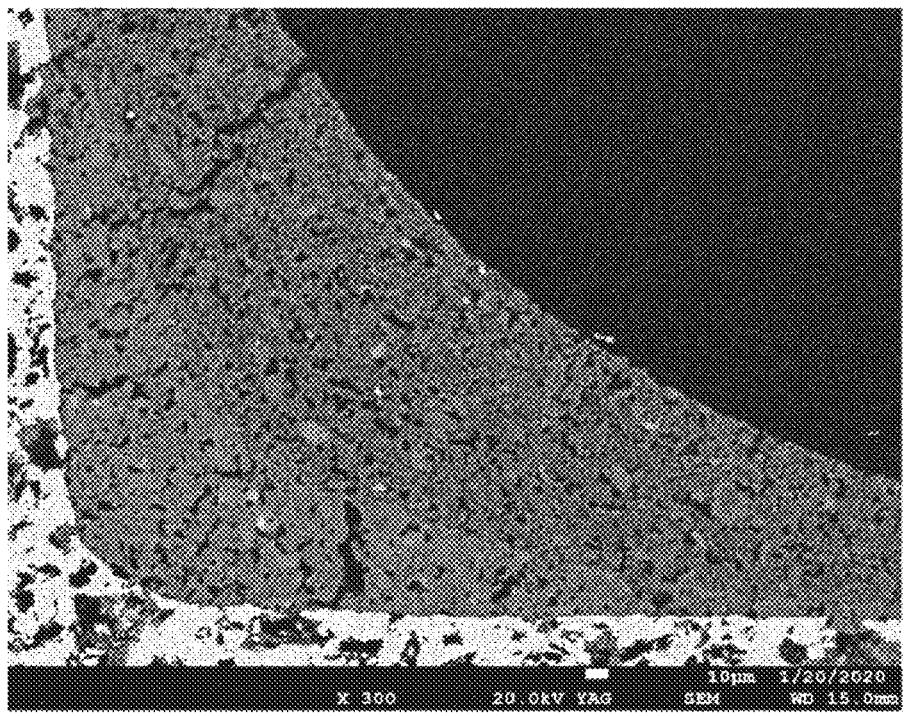

portion of pores with a diameter of 0.5 to 50 μm of 20 to 30%.

12 Claims, 1 Drawing Sheet

(52) U.S. Cl.
CPC .............. *B01D 2255/1021* (2013.01); *B01D 2255/1023* (2013.01); *B01D 2255/9032* (2013.01)

(58) Field of Classification Search
CPC ... B01D 2255/9205; B01J 23/44; B01J 35/66; F01N 3/035; F01N 3/022; F01N 3/0222; F01N 3/28; F01N 3/2825; F01N 3/2828; F01N 2330/06; Y02A 50/20; Y02T 10/12
See application file for complete search history.

(56) References Cited

U.S. PATENT DOCUMENTS

| | | | |
|---|---|---|---|
| 9,261,004 | B2* | 2/2016 | Arnold .................... F01N 3/035 |
| 9,687,785 | B2* | 6/2017 | Chen .................... F01N 3/0222 |
| 9,764,310 | B2 | 9/2017 | Markatou et al. |
| 10,137,413 | B2 | 11/2018 | Cole et al. |
| 10,155,197 | B2 | 12/2018 | Cole et al. |
| 10,213,767 | B2 | 2/2019 | Reith et al. |
| 10,449,518 | B2 | 10/2019 | Markatou et al. |
| 10,843,171 | B2 | 11/2020 | Markatou et al. |
| 2005/0247038 | A1* | 11/2005 | Takahashi ............ F01N 3/0222 55/523 |
| 2007/0039295 | A1* | 2/2007 | Ohno .................... F01N 13/009 55/482 |
| 2010/0257843 | A1 | 10/2010 | Hoke et al. |
| 2011/0099975 | A1 | 5/2011 | Bailey et al. |
| 2019/0126247 | A1* | 5/2019 | Deeba .................. B01D 53/945 |
| 2019/0201844 | A1 | 7/2019 | Hayama |

FOREIGN PATENT DOCUMENTS

| | | |
|---|---|---|
| CN | 105813716 A | 7/2016 |
| CN | 108472588 A | 8/2018 |
| CN | 110191751 A | 8/2019 |
| EP | 2 651 540 B1 | 5/2019 |
| JP | 2010-167381 A | 8/2010 |
| JP | 2013-146706 A | 8/2013 |
| JP | 2015-066516 A | 4/2015 |
| JP | 2016-013552 A | 1/2016 |
| JP | 2018-171615 A | 11/2018 |
| JP | 2019-534137 A | 11/2019 |
| WO | 2012/079598 A1 | 6/2012 |
| WO | 2017/093720 A1 | 6/2017 |
| WO | 2020/058265 A1 | 3/2020 |
| WO | 2020/260669 A1 | 12/2020 |
| WO | 2021/074605 A1 | 4/2021 |

OTHER PUBLICATIONS

Communication from the Examining Division received Nov. 16, 2023 in European Application No. 21722912.9 (3 pages in German; 3 pages English translation).
Second Office Action mailed Nov. 14, 2024 for Chinese Patent Application No. 202180033045.7 (3 pages in Chinese; 5 pages English translation).
Translation of the Written Opinion of the International Searching Authority mailed Jun. 23, 2021 for International Patent Application No. PCT/EP2021/061931 (5 pages).
International Preliminary Report on Patentability mailed Nov. 8, 2022 for International Patent Application No. PCT/EP2021/061931 (7 pages in German; 6 pages English translation).
First Office Action mailed Jul. 5, 2024 for Chinese Patent Application No. 202180033045.7 (7 pages in Chinese; 5 pages English translation).
International Search Report dated Jun. 23, 2021 for International Patent Application No. PCT/EP2021/061931 (3 pages in German with English translation).
Written Opinion of the International Searching Authority dated Jun. 23, 2021 for International Patent Application No. PCT/EP2021/061931 (6 pages in German).
European Search Report mailed Sep. 22, 2020 for European Patent Application No. 20173091.8 (7 pages in German with translation).
DIN 66132: Bestimmung der spezifischen Oberfläche von Feststoffen durch Stickstoffadsorption; Einpunkt-Differenzverfahren nach Haul und Dümbgen. [Determination of specific surface area of solids by adsorption of nitrogen; single-point differential method according to Haul and Dümbgen.] Standard by Deutsches Institut Fur Normung E.V. [German National Standard], 1975. 5 pages in German with English machine translation.
Office Action mailed Mar. 11, 2025 for Japanese Patent Application No. 2022-563066 (3 pages in Japanese; 4 pages English machine translation).

* cited by examiner

OXIDATION CATALYST WITH PHOSPHORUS TRAP

The present invention relates to an oxidation catalyst for purifying the exhaust gases of diesel engines, which comprises a phosphorus trap.

In addition to carbon monoxide CO, hydrocarbons HC and nitrogen oxides NOx, the raw exhaust gas of diesel engines contains a relatively high oxygen content of up to 15% by volume. Additionally, particulate emissions are included which predominantly consist of soot residues and in some cases of organic agglomerates and result from a partially incomplete combustion of fuel in the cylinder.

While diesel particulate filters with and without catalytically active coating are suitable for removing the particle emissions, and nitrogen oxides can be converted to nitrogen, for example, by selective catalytic reduction (SCR) in a so-called SCR catalyst, carbon monoxide and hydrocarbons are rendered harmless by oxidation in a suitable oxidation catalyst.

Oxidation catalysts are extensively described in the literature. These are, for example, so-called flow-through substrates made of ceramic or metal, which carry, as essential catalytically active constituents, noble metals, such as platinum and palladium, on large-surface-area, porous, high-melting-point oxides, for example aluminum oxide.

Already zoned oxidation catalysts are also described which have material zones of different composition in the direction of flow of the exhaust gas, with which the exhaust gas comes into contact in succession.

For example, US2010/257843, US2011/099975, and WO2012/079598 A1 describe zoned oxidation catalysts which contain platinum and palladium. In addition to the components already mentioned, the exhaust gas of diesel engines frequently also comprises phosphorus compounds originating from oil additives. These are deposited on the diesel oxidation catalyst and impair its oxidation capability over its service life.

This problem and possibilities for solving it are already described in the literature.

For instance, JP 2015066516A discloses a three-way catalyst which contains a composite oxide of magnesium and cerium as a phosphorus trap in its uppermost layer.

JP2013146706A teaches a two-layered catalyst, the lower layer containing noble metal, and the upper layer containing no noble metal or less noble metal than the lower layer, and the upper layer having a higher porosity than the lower layer.

There is still a need for oxidation catalysts which are effectively protected against phosphorous contamination over their entire service life.

The present invention accordingly relates to a catalyst containing
  a carrier substrate with a first end a and a second end b, and length L,
  a material zone A containing a platinum group metal on a support material with a load of 40 to 150 g/l, relative to the volume of the carrier substrate, and
  material zone B containing a platinum group metal on a support material with a load of 75 to 200 g/l, relative to the volume of the carrier substrate, wherein material zone B has a greater content of platinum group metal, relative to the volume of the carrier substrate and calculated in g/l, than material zone A, and wherein material zone B has a proportion of pores with a diameter of 0.5 to 50 μm of 20 to 30%.

Material zone B contains, as platinum group metal, for example, only platinum, only palladium, or platinum and palladium. Platinum and palladium are preferred, in particular in a weight ratio of 20:1 to 1:5, preference being given to a weight ratio of 10:1 to 1:3.

In material zone B, the platinum group metal is present in particular in amounts of 0.53 to 2.5 g/l, preferably in amounts of 0.60 to 1.4 g/l, relative to the volume of the carrier substrate.

Material zone B has a proportion of pores with a diameter of 0.5 to 50 μm of 20 to 30%.

The pore proportion in the context of the present application is understood to mean the pore volume relative to the total volume. In the present case, for example, a pore proportion of material zone B of 20% thus means that 20% of the total volume of material zone B is formed by pores having a diameter of 0.5 to 50 μm.

The pore proportion of a material zone or of a catalyst region can be determined by means of a method comprising the following steps:
  selecting the catalyst region to be examined,
  creating a transverse section of the catalyst region to be examined, in which the pores are filled with an organic resin,
  creating an image of the transverse section by means of a scanning electron microscope (SEM),
  selecting the partial region to be examined of the SEM image,
  converting the selected partial region of the SEM image into a binary image by means of an image analysis program, and
  carrying out a porosity distribution calculation using the binary image by means of an image analysis program and subsequently determining the pore proportion.

To produce a transverse section of a catalyst region in which the pores are filled with an organic resin, cross-section methods known to the person skilled in the art are available.

Figure 2:
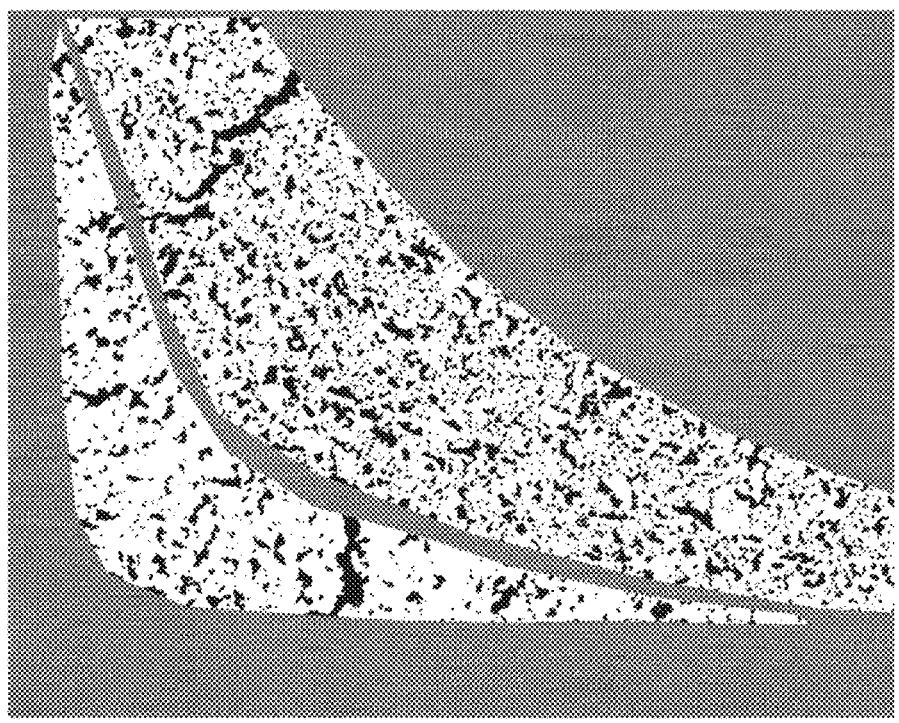

The production of an image of the transverse section by means of a scanning electron microscope (SEM) likewise takes place according to known and comprehensively described methods. The specific measurement conditions are not critical, i.e., they have no influence on the end result. In this case, the detection of backscattered primary electrons is used as an imaging method. These backscattered primary electrons provide a signal intensity which depends on the average atomic number of the material examined. Heavier elements therefore appear light because they scatter more, whereas more lightweight elements appear darker. Thus, in the SEM image obtained, the pores appear dark gray to black, while the materials of the washcoat appear lighter. FIG. 1 shows an SEM image, created in this way, of the catalyst of the following example 1, in which the support and the two material zones A and B are easily distinguishable from one another. In the next step, the partial region to be examined, or also multiple partial regions to be examined, of the SEM image, for instance a region of a material zone, is selected, and a binary image is created by a threshold method using image analysis software. In the context of the present invention, the image analysis software was programmed using Matlab Version 2019 and the associated image processing tool box. FIG. 2 shows a binary image created by means of the image analysis software from the SEM image of FIG. 1. In the image, the pores appear black and the materials of the washcoat appear white. Gray regions are non-selected regions that are not of interest. Pore proportions are then calculated using the image analysis software by means of morphological image processing methods. In addition to the above-described Matlab-programmed image analysis software, other programs known to the person skilled in the art are also available, for example the ImageJ program, which can be adapted as required by programming plugins, for example, in order to carry out a pore analysis.

The support material in material zone B can be aluminum oxide, doped aluminum oxide, silicon oxide, magnesium oxide, titanium oxide or a mixture or a mixed oxide or a composite oxide of at least two of these materials. However, it is in particular aluminum oxide.

Material zone A contains, as platinum group metal, for example, only platinum, only palladium, or platinum and palladium. Platinum and palladium are preferred, in particular in a weight ratio of 20:1 to 1:5, preference being given to a weight ratio of 15:1 to 1:1.

In material zone A, the platinum group metal is present in particular in amounts of 0.18 to 1.4 g/l, preferably in amounts of 0.25 to 0.7 g/l, relative to the volume of the carrier substrate.

The platinum group metal in material zone A is present on a support material. All materials that are familiar to the person skilled in the art for this purpose are considered as support materials. It has, in particular, a BET surface area of 30 to 250 m$^2$/g, preferably of 100 to 200 m$^2$/g (determined according to DIN 66132), and is preferably selected from the group consisting of aluminum oxide, doped aluminum oxide, silicon oxide, magnesium oxide, titanium oxide and a mixture or a mixed oxide or composite oxide of at least two of these materials.

Aluminum oxide, magnesium/aluminum mixed oxides, and aluminum/silicon mixed oxides are preferred.

In addition, aluminum oxide which is doped, for example, with 1 to 10 wt. %, in particular 3 to 6 wt. %, lanthanum oxide can also be used.

The pore proportion of material zone A is not critical. Material zone A preferably has a proportion of pores with a diameter of 0.5 to 50 μm of 10 to 30%.

In the oxidation catalyst according to the invention, the loading with material zone B is preferably higher than the loading with material zone A, in each case in g/l and relative to the volume of the carrier substrate.

The loading of material zone B is preferably 75 to 150 g/l. The loading of material zone A is preferably 50 to 75 g/l.

Material zones A and B can be arranged on the carrier substrate in different ways.

In a preferred embodiment, material zone A is coated over the entire length L of the carrier substrate, while material zone B extends from the first end a of the carrier substrate over 20 to 80%, preferably 30 to 70%, of the length L and is located on the material zone A.

In a further preferred embodiment, material zone A extends from the second end of the carrier substrate over 40 to 60% of the length L, while material zone B extends from the first end of the carrier substrate over 40 to 60% of the length L, where $L=L_A+L_B$ or $L<L_A+L_B$ or $L>L_A+L_B$ where $L_A$ is the length of material zone A, and $L_B$ is the length of material zone B.

The case $L>L_A+L_B$ means that a portion of the support body remains free of coatings. In particular, a gap, which is at least 0.5 cm long, i.e., for example, from 0.5 to 1 cm, remains between material zones A and B in this case.

The catalyst according to the invention comprises a support body. This is in particular a flow-through substrate but can also be a wall-flow filter. A wall-flow filter is a support body comprising channels of length L, which extend in parallel between a first and a second end of the wall-flow filter, which are alternately closed at either the first or second end and are separated by porous walls. A flow-through substrate differs from a wall-flow filter in particular in that the channels of length L are open at its two ends. In an uncoated state, wall-flow filters have, for example, porosities of 30 to 80%, in particular 50 to 75%. In the uncoated state, their average pore size is, for example, 5 to 30 micrometers.

Generally, the pores of the wall-flow filter are so-called open pores, that is, they have a connection to the channels. Furthermore, the pores are generally interconnected with one another. This enables, on the one hand, easy coating of the inner pore surfaces and, on the other hand, easy passage of the exhaust gas through the porous walls of the wall-flow filter.

Like wall-flow filters, flow-through substrates are known to the person skilled in the art and are available on the market. They consist, for example, of silicon carbide, aluminum titanate, or cordierite.

Catalysts according to the invention can be produced by methods familiar to the person skilled in the art, such as by the customary dip-coating methods or pump and suction coating methods by means of a washcoat, i.e., an aqueous suspension of the constituents forming the respective material zone. A thermal post-treatment (calcination) may follow.

The person skilled in the art is aware that, in the case of wall-flow filters, their average pore size and the average particle size of the materials to be coated can be matched to each other in such a manner that they lie on the porous walls that form the channels of the wall-flow filter (on-wall coating). The mean particle size of the materials to be coated can also be selected such that they are located in the porous walls that form the channels of the wall-flow filter; i.e., that the inner pore surfaces are coated (in-wall coating). In this case, the average particle size of the coating materials must be small enough to penetrate into the pores of the wall-flow filter.

In another embodiment of the present invention, a carrier substrate composed of corrugated sheets of inert materials is used. Such carrier substrates are known as "corrugated substrates" to those skilled in the art. Suitable inert materials are, for example, fibrous materials having an average fiber diameter of 50 to 250 μm and an average fiber length of 2 to 30 mm. Preferably, fibrous materials are heat-resistant and consist of silicon dioxide, in particular glass fibers. For the production of such carrier substrates, sheets of the aforementioned fiber materials are, for example, corrugated in the known manner and the individual corrugated sheets are formed into a cylindrical monolithically structured body with channels running through the body. Preferably, a monolithically structured body with a crosswise corrugation structure is formed by stacking a number of the corrugated sheets into parallel layers with different orientation of the corrugation between the layers. In one embodiment, uncorrugated (i.e. flat) sheets can be arranged between the corrugated sheets.

Substrates made of corrugated sheets can be coated directly with material zones A and B, but they are preferably first coated with an inert material, for example titanium dioxide, and only then with the catalytic material.

The catalyst according to the invention is outstandingly suitable for the oxidation of carbon monoxide, hydrocarbons, and nitrogen monoxide in the exhaust gas of diesel engines. In the process, it is much less susceptible to contamination by phosphorus compounds than catalysts known to date.

The present invention also relates to a method for purifying exhaust gases of motor vehicles which are operated with lean-burn engines, such as diesel engines, characterized in that the exhaust gas is passed over a catalyst according to the invention, wherein the exhaust gas enters the catalyst at the first end a of the carrier substrate and exits again at the second end b.

EXAMPLE 1 a) A commercially available round flow-through substrate of cordierite having the dimensions 5.66"×4.00" with a cell density of 400 cpsi and a wall thickness of 4 mil was coated over its entire length with a washcoat containing 0.353 g/l platinum and palladium in a mass ratio of 12:1, supported on a commercially available aluminum oxide doped with 5% silicon oxide. The washcoat loading was 60 g/l. The pore proportion determined by the method described above (see also FIGS. 1 and 2) was 15%.

b) In a second step, the catalyst obtained in step a) was coated, starting from one end, on 75% of its length with a washcoat containing 0.79 g/l platinum and palladium in a mass ratio of 1:1 supported on a highly porous aluminum oxide. The washcoat loading was 110 g/l. The pore proportion (pores with a diameter of 0.5 to 50 µm) of the layer applied in the second step, determined by the method described above (see also FIGS. 1 and 2), was 24%.

The catalyst obtained is referred to below as K1.

EXAMPLE 2 a) A commercially available round flow-through substrate of cordierite having the dimensions 5.66"×4.00" with a cell density of 400 cpsi and a wall thickness of 4 mil was coated over 50% of its length with a washcoat containing 0.353 g/l platinum and palladium in a mass ratio of 12:1, supported on a commercially available aluminum oxide doped with 5% silicon oxide. The washcoat loading was 60 g/l. The pore proportion determined by the method described above was 15%.

b) In a second step, the catalyst obtained in step a) was coated, starting from the uncoated end, over 50% of its length with a washcoat containing 1.4 g/l platinum and palladium in a mass ratio of 1:1 supported on a highly porous aluminum oxide. The washcoat loading was 75 g/l. The pore proportion (pores with a diameter of 0.5 to 50 µm) of the layer applied in the second step determined by the method described above was 24%.

The catalyst obtained is referred to below as K2.

COMPARATIVE EXAMPLE 1

Example 1 was repeated with the difference that in step b) the washcoat loading was only 60 g/l.

The catalyst obtained is referred to below as VK1.

COMPARATIVE EXAMPLE 2 a) A commercially available round flow-through substrate of cordierite having the dimensions 5.66"×4.00" with a cell density of 400 cpsi and a wall thickness of 4 mil was coated over 50% of its length with a washcoat containing 0.353 g/l platinum and palladium in a mass ratio of 3:1, supported on a commercially available aluminum oxide doped with 5% silicon oxide. The washcoat loading was 100 g/l. The pore proportion (pores with a diameter of 0.5 to 50 µm) determined by the method described above was 15%.

b) In a second step, the catalyst obtained in step a) was coated, starting from the uncoated end, over 50% of its length with a washcoat containing 1.4 g/l platinum and palladium in a mass ratio of 3:1 supported on a highly porous aluminum oxide. The washcoat loading was 100 g/l. The pore proportion (pores with a diameter of 0.5 to 50 µm) of the layer applied in the second step determined by the method described above was 15%.

The catalyst obtained is referred to below as VK2.

Comparative Tests a) The catalysts K1, K2, VK1 and VK2 were aged for 50 hours at 650° C. with a humidity of 7%.

b) The aged catalysts were aged for 10, 20, 30 and 40 hours on an engine test bench by adding a phosphorus-containing oil additive to the fuel. The addition of oil additive was calculated for an exposure of 0.6 g/l P per hour.

c) For the catalysts treated with phosphorus according to step b), the time was determined at which loaded hydrocarbon is no longer oxidized and breaks through (THC slip). To this end, the same amount of diesel was added for all catalysts in order to generate exothermicity, and the HC slip was measured in the process. It was also measured whether the target temperature of 575° C. is reached.

d) Results

|  | HC slip without P exposure [ppm] | HC slip at 6 g/L P exposure [ppm] | HC slip at 12 g/L P exposure [ppm] | HC slip at 18 g/L P exposure [ppm] | HC slip at 24 g/L P exposure [ppm] | Quench temperature [° C.] |
|---|---|---|---|---|---|---|
| K1 | 1500 | 2000 | 2800 | 3800 | 5000 | Target temperature 575 reached |
| VK1 | 1400 | 2200 | 4500 | 7500; quench |  | 525 |
| K2 | 1000 | 2000 | 5000; quench |  |  | 540 |
| VK2 | 1200 | 2400 | 8000; quench |  | 8000 | 490 |

K1 is the only catalyst to reach the target temperature of 575° C. with an exposure of 24 g/L. VK1, with a lower washcoat loading in material zone B, reaches only 525° C. in the test, already at 18 g/L.

In comparison with VK2, K2 is more resistant to phosphorus and is extinguished only at 12 g/L P at 540° C. with an HC breakthrough of 5000 ppm, whereas VK2 is extinguished at this exposure at 490° C. with an HC breakthrough of 8000 ppm.

The invention claimed is:

1. A catalyst, containing
   a carrier substrate with a first end a and a second end b, and length L, a material zone A containing a platinum group metal on a support material with a load of 40 to 150 g/l, relative to the volume of the carrier substrate, and material zone B containing a platinum group metal on a support material with a load of 75 to 200 g/l, relative to the volume of the carrier substrate, wherein material zone B has a greater content of platinum group metal, relative to the volume of the carrier substrate and calculated in g/l, than material zone A, and wherein material zone B has a proportion of pores with a diameter of 0.5 to 50 µm of 20 to 30%.

2. The catalyst according to claim 1, wherein material zone A contains, as platinum group metal, palladium and platinum.

3. The catalyst according to claim 2, wherein the weight ratio of platinum and palladium in material zone A is 20:1 to 1:5.

4. The catalyst according to claim 1, wherein the platinum group metal in material zone A is present in amounts of 0.18 to 0.53 g/l relative to the volume of the carrier substrate.

5. The catalyst according to claim 1, wherein material zone B contains, as platinum group metal, platinum and palladium.

6. The catalyst according to claim 5, wherein the weight ratio of platinum and palladium in material zone B is 20:1 to 1:5.

7. The catalyst according to claim 1, wherein the platinum group metal in material zone B is present in amounts of 0.53 to 1.06 g/l relative to the volume of the carrier substrate.

8. The catalyst according to claim 1, wherein material zone A is coated over the entire length L of the carrier substrate, while material zone B extends from the first end a of the carrier substrate over 20 to 80% of the length L and is located on the material zone A.

9. The catalyst according to claim 1, wherein the carrier substrate is a flow-through substrate.

10. The catalyst according to claim 1, wherein the pore proportion is determined by a method comprising the following steps:

selecting the catalyst region to be examined, creating a transverse section of the catalyst region to be examined, in which the pores are filled with an organic resin, creating an image of the transverse section by means of a scanning electron microscope (SEM), selecting the partial region to be examined of the SEM image, converting the selected partial region of the SEM image into a binary image by means of an image analysis program, and carrying out a porosity distribution calculation using the binary image by means of an image analysis program and subsequently determining the pore proportion.

11. The catalyst according to claim 1, wherein material zone A extends from the second end b of the carrier substrate over 40 to 60% of the length L, while material zone B extends from the first end a of the carrier substrate over 40 to 60% of the length L.

12. A method for purifying exhaust gases of motor vehicles which are operated with learn-burn engines, comprising: passing the exhaust gas over a catalyst according to claim 1, wherein the exhaust gas enters the catalyst at the first end of the carrier substrate and exits again at the second end b.

* * * * *